(12) United States Patent
Tsai

(10) Patent No.: US 7,281,611 B2
(45) Date of Patent: Oct. 16, 2007

(54) BICYCLE HANDBRAKE CONDUIT STRUCTURE

(76) Inventor: Szu-Fang Tsai, 101, Sec. 1, Kuang-Ming Rd., Pu-Yen Hsiang, Chang-Hua Hsien (TW)

( * ) Notice: Subject to any disclaimer, the term of this patent is extended or adjusted under 35 U.S.C. 154(b) by 236 days.

(21) Appl. No.: 11/060,415

(22) Filed: Feb. 18, 2005

(65) Prior Publication Data

US 2006/0185939 A1 Aug. 24, 2006

(51) Int. Cl.
*B62L 1/02* (2006.01)
(52) U.S. Cl. ............... 188/24.12; 188/24.19; 188/20; 74/501.5 R; 74/500.5; 74/502.6
(58) Field of Classification Search ............ 188/24.12, 188/24.11, 24.19, 20, 24.15, 24.21, 24.22, 188/344; 74/501.5 R, 502.4, 502.5, 502.6, 74/500.5, 501.6, 502
See application file for complete search history.

(56) References Cited

U.S. PATENT DOCUMENTS

| | | | | |
|---|---|---|---|---|
| 2,699,228 A * | 1/1955 | Mennesson | ............... | 188/24.19 |
| 4,023,653 A * | 5/1977 | Yoshigai | .................. | 188/24.19 |
| 4,027,746 A * | 6/1977 | Kine | ........................ | 188/24.19 |
| 4,325,467 A * | 4/1982 | Kine | ........................ | 188/24.12 |
| 4,591,026 A * | 5/1986 | Nagano | ...................... | 188/2 D |
| 4,632,225 A * | 12/1986 | Mathauser | ............... | 188/24.18 |
| 4,823,915 A * | 4/1989 | Nagano | ...................... | 188/2 D |
| 4,896,750 A * | 1/1990 | Tseng | ...................... | 188/24.19 |
| 5,564,531 A * | 10/1996 | Lumpkin | ................. | 188/24.19 |
| 5,704,453 A * | 1/1998 | Tsai | ........................ | 188/24.21 |
| 5,896,956 A * | 4/1999 | Lin et al. | ................. | 188/24.22 |
| 5,908,089 A * | 6/1999 | Sugimoto | ............... | 188/24.21 |
| 6,032,766 A * | 3/2000 | Yang | ....................... | 188/24.19 |
| 6,220,399 B1 * | 4/2001 | Phillips et al. | ........... | 188/24.21 |
| 6,279,688 B1 * | 8/2001 | Goldman et al. | ........ | 188/24.22 |
| 2006/0243542 A1* | 11/2006 | Tsai | ........................ | 188/24.11 |

* cited by examiner

*Primary Examiner*—Devon C. Kramer
*Assistant Examiner*—Mariano Sy
(74) *Attorney, Agent, or Firm*—Troxell Law Office, PLLC

(57) ABSTRACT

The present invention provides an adjusting tube on an end of the brake cable conduit, which is composed of rotating first and second tubular bodies. At where the first and second tubular bodies are joined, they are configured to have symmetrical and matching indented and non-indented sections. When the first and second tubular bodies are rotated to have their non-indented and indented sections aligned and fitted together, the brake wire could be relieved from the handbrake assembly, the gaps between the brake pads and the wheel rim are enlarged, and the wheel could therefore be easily assembled to or disassembled from the bicycle frame through the enlarged gaps.

8 Claims, 4 Drawing Sheets

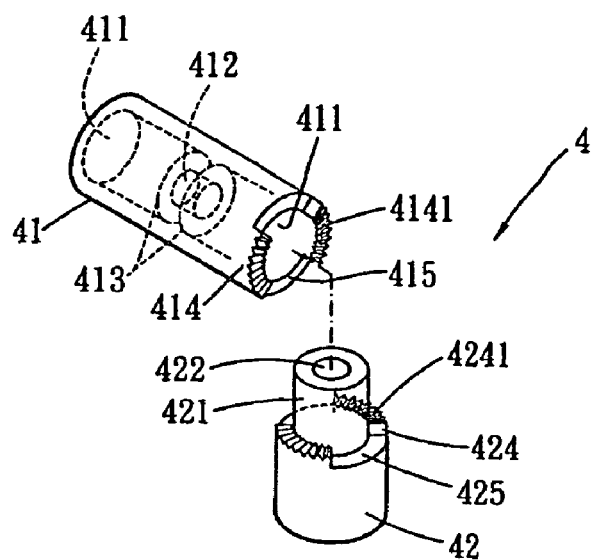
FIG. 1
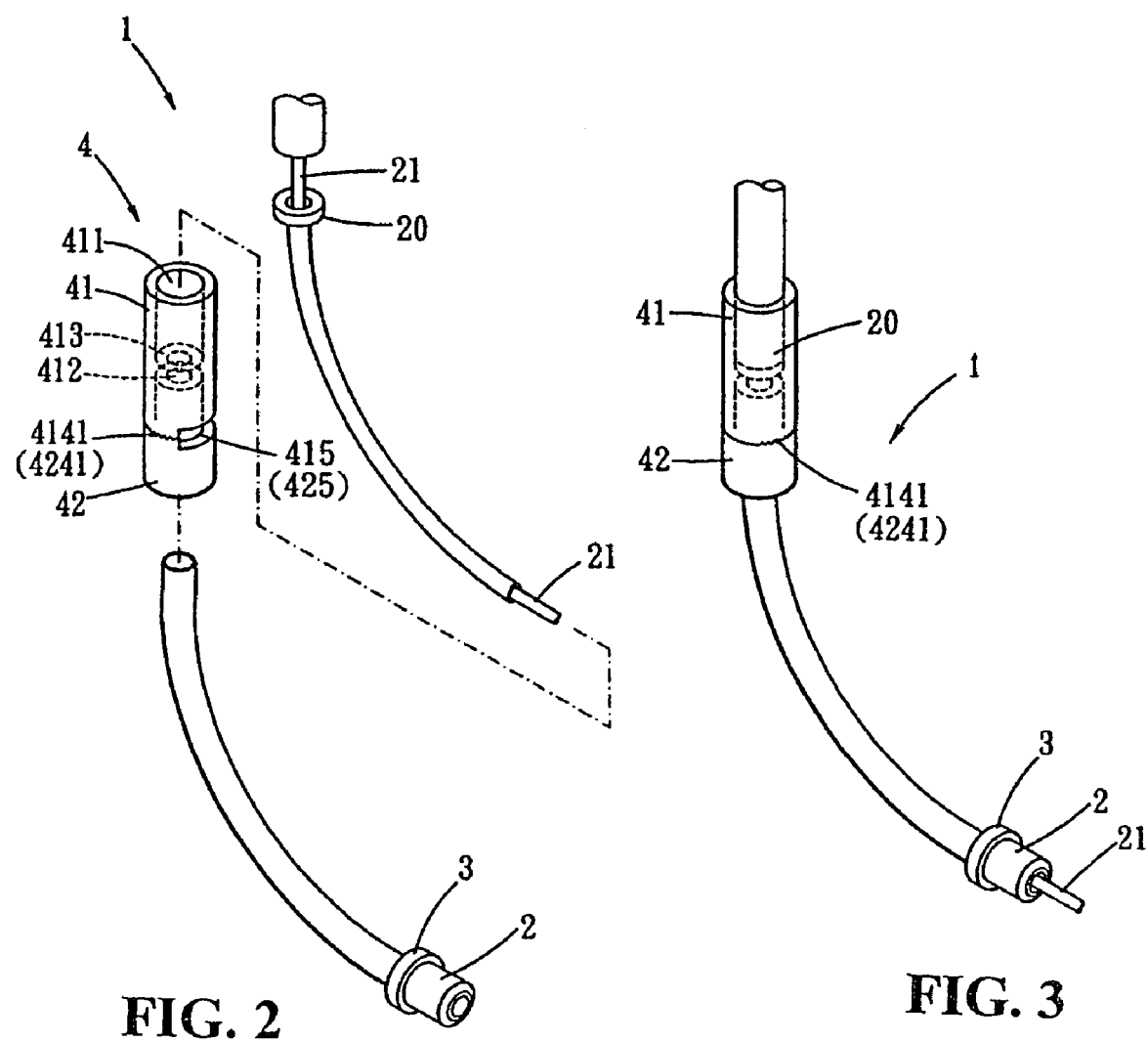
FIG. 2
FIG. 3

_US 7,281,611 B2_

BICYCLE HANDBRAKE CONDUIT STRUCTURE

BACKGROUND OF THE INVENTION (a) Technical Field of the Invention

The present invention generally relates to bicycle handbrakes, and more specifically to the conduit structure of bicycle handbrakes.

(b) Description of the Prior Art

Conventionally, a bicycle handbrake assembly is fixedly locked, using the front wheel as an example, to the front fork at a specific position. The wheel is positioned between the left and right brake arms of the handbrake assembly, with the wheel rim facing directly to the brake pads.

A long and narrow connection seat is riveted to a top portion of the left brake arm. At an end opposite to the rivet point, the connection seat has a slot for accommodating a connector at an end of the brake cable conduit. The conduit has a tube on the other end having a larger diameter. A brake wire is inserted in the conduit and extends out from the connector end to be fixedly locked to the right brake arm. The brake wire such arranged exerts a counter force on the brake arms to balance the force pushing the brake arms outward by their return springs. The brake arms are therefore parallel to each other at either sides of the wheel.

Under this balanced condition, there are only tiny gaps between the wheel rim and the brake pads. It is therefore difficult to disassemble the wheel from or assemble the wheel to the bicycle frame through such tiny gaps.

Conventionally, the brake wire is tightened or loosed by a bolt. The bolt is therefore screwed so that the brake wire is not stretched and exerts no counter force on the brake arms. As such, the return springs push the brake arms apart form each other, enlarging the gaps between the brake pad and the wheel rim. The wheel therefore could be disassembled from the bicycle frame through the enlarged gaps.

Using a bolt to control the brake wire is often quite inconvenient as, after the wheel is assembled to the bicycle frame; constant trial and error in adjusting the brake wire's tightness is inevitable.

SUMMARY OF THE INVENTION

The primary purpose of the present invention is to overcome the aforementioned difficulties in the assembly and disassembly of bicycle wheels from the bicycle frame, the present invention provides an adjusting tube on an end of the brake cable conduit, which is composed of rotating first and second tubular bodies. At where the first and second tubular bodies are joined, they are configured to have symmetrical and matching indented and non-indented sections. When the first and second tubular bodies are rotated to have their non-indented sections aligned and occluded together, the brake wire is in a stretched condition and keeps the brake arms in their normal and balanced position. On the other hand, when the first and second tubular bodies are rotated to have their non-indented and indented sections aligned and fitted together, the brake wire could be relieved from the handbrake assembly, the gaps between the brake pads and the wheel rim are enlarged, and the wheel could therefore be easily assembled to or disassembled from the bicycle frame through the enlarged gaps.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a perspective view showing the assembly of the adjusting tube according to the present invention.

FIG. 2 is a perspective view showing the assembly of the brake cable, the adjusting tube, and the conduit according to the present invention.

FIG. 3 is a perspective view showing the brake cable, the adjusting tube, and the conduit after they are assembled according to the present invention.

DETAILED DESCRIPTION OF THE PREFERRED EMBODIMENTS

Figure 4:
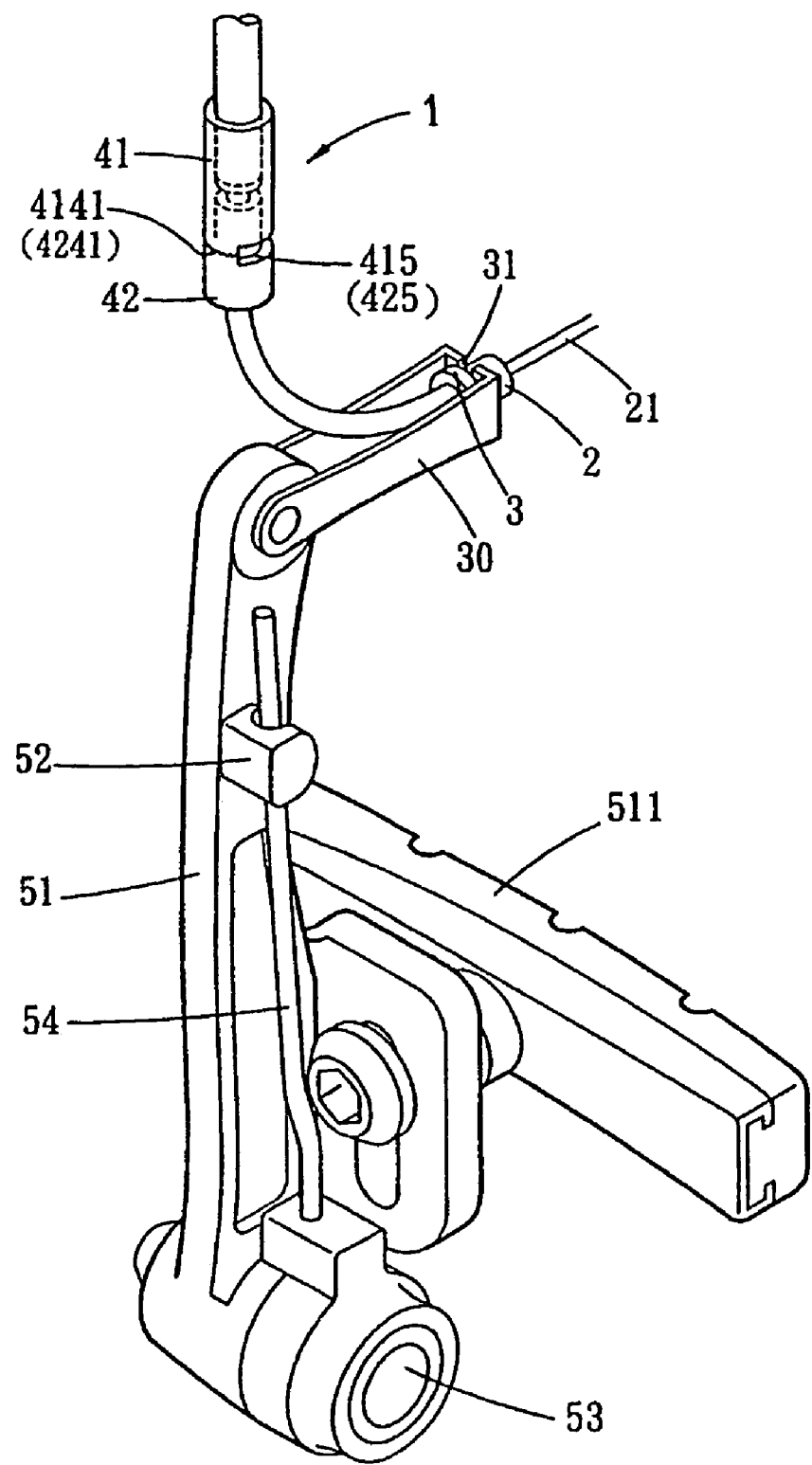
FIG. 4 is a perspective view showing the assembly of the conduit to a brake arm according to the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following, detailed description along with the accompanied drawings is given to better explain preferred embodiments of the present invention. Please note that some parts of the accompanied drawings are not drawn to scale or are somewhat exaggerated. It should be understood that this is for illustrative purpose and is not intended to limit the presentation in any way.

Please refer to FIGS. 1 to 3. As illustrated, the brake cable conduit 1 has a curved tubular body with a connector 2 on one end and an adjusting tube 4 at the other end. At where it is joined to the conduit 1, the connector 2 has a flange 3 having a larger diameter than that of the connector 2.

The adjusting tube 4 contains a longer first tubular body 41 and a shorter second tubular body 42. The inner wall of the first tubular body 41 is shrunk at a pre-determined position to form a blocking wall 413 and a through hole 412. The hollow space of the tubular body 41 is separated by the blocking wall 413 into two sections 411 having a larger diameter than that of the through hole 412. A brake cable 20 having a brake wire 21 passing through could be inserted into one of the hollow sections 411 and stopped by the blocking wall 413. On the other hand, the second tubular body 42 has its outer wall shrunk for a distance to form a section 421 that could be fitted in the other hollow section 411 and stopped by the blocking wall 413 as well.

On an end of the first tubular body 41 and along its tubular wall, there ire periodic and interleaving indented (for a pre-determined distance) sections 415 and non-indented sections 414. The non-indented sections 414 further have a plurality of teeth 4141.

The second tubular body 42 has a through hole 422, which matches the first tubular body 41's through hole 412. On an end of the second tubular body 42 and along its tubular wall, there are periodic and interleaving indented (for a pre-determined distance) sections 425 and non-indented sections 424. The non-indented sections 424 further have a plurality of teeth 4241. The first and second tubular bodies 41 and 42 are configured such that, when they are joined, the teeth 4141 and the teeth 4241 are occluded together, which prevents tubular bodies 41 and 42 from rotating. The indented sections 415, 425, and the non-indented sections 414, 424 are configured symmetrically such that the non-indented sections 414 could be fitted inside the indented sections 425, and the non-indented sections 424 could be fitted inside the indented sections 415, respectively.

Figure 5:
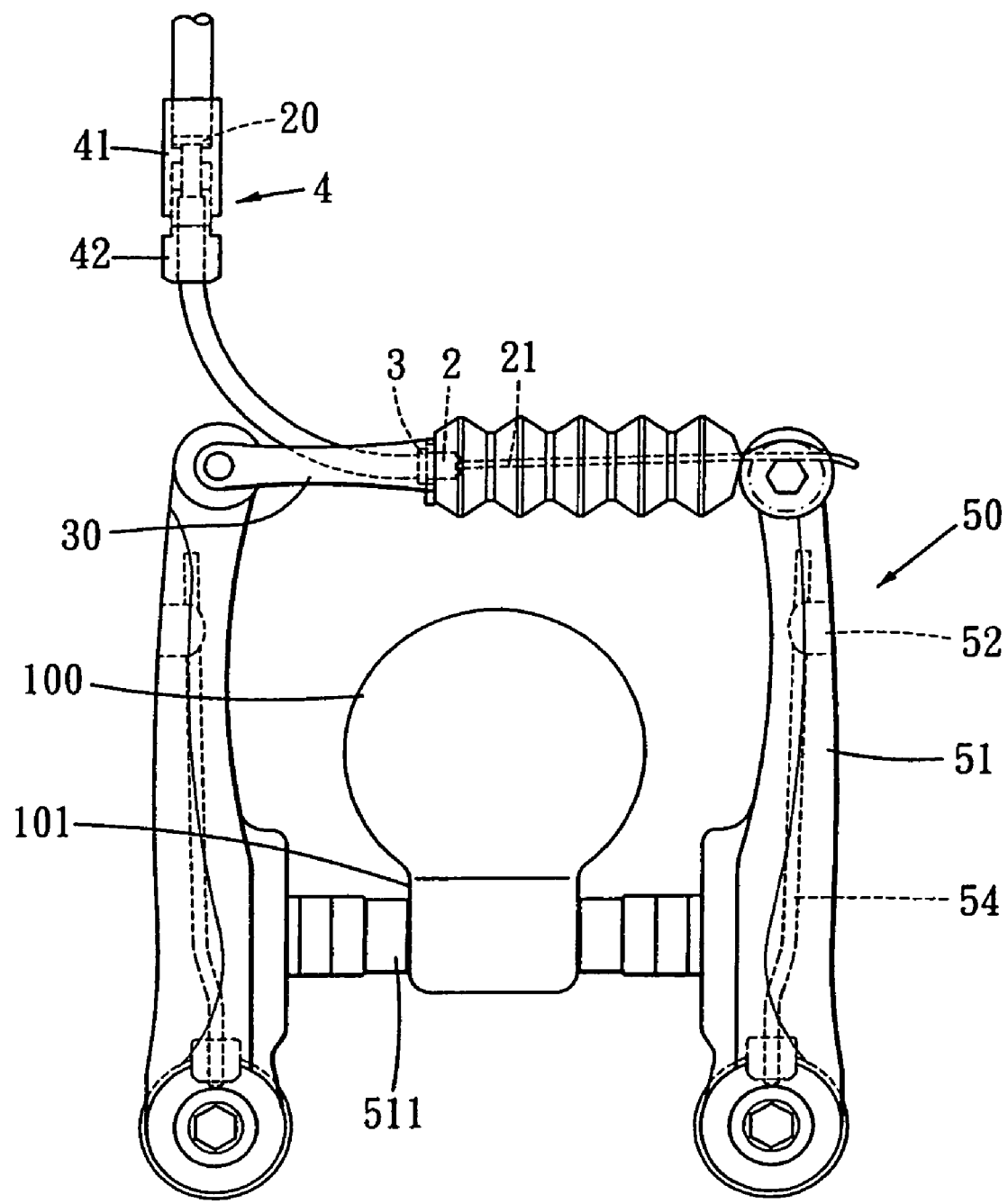
FIG. 5 is a side view showing the brake arms under the normal and balanced condition according to the present invention.

Please refer to FIGS. 4 and 5. A brake arm 51 has a conduit connection seat 30 riveted perpendicular to the brake arm 51. The conduit connection seat 30 is a long and narrow open box. On a shorter end opposite to the rivet point of the conduit connection seat 30, there is a slot 31 into which the connector 2 could be fitted and the flange 3 is against the inner wall of the slot 31.

A brake wire 21 extended from the handle of a handbrake operating device is inserted into a brake cable 20, which in turn is inserted through the adjusting tube 4 into the conduit 1. The brake wire 21 then sticks out from the connector 2 and fixedly locked to another brake arm 51 of the handbrake assembly 50. Each of the brake arms 51 has a stopping block 52 on the upper part of the brake arm 51. A return spring 54 has an end locked inside the joining member 53 which is for pin-joining the brake arm 51 to the front fork. The return spring 54 has the other end fitted in a trough of the stopping block 52. The return spring 54 such arranged exerts a force on the brake arm 51 to push it away from the wheel rim.

On the other hand, after the brake wire 21 is installed, the brake cable 20 forces the adjusting tube 4 to closely join with the conduit 1 and the brake wire 21 exerts an opposite force on the brake arm 51 which balances the force exerted by the return spring 54.

As illustrated in FIG. 5, under the balanced condition, there is only a tiny gap between the brake pad 511 and the rim 101 of the wheel 100. The left and right brake arms 51 of the handbrake assembly 50 are parallel to each other.

Figure 6:
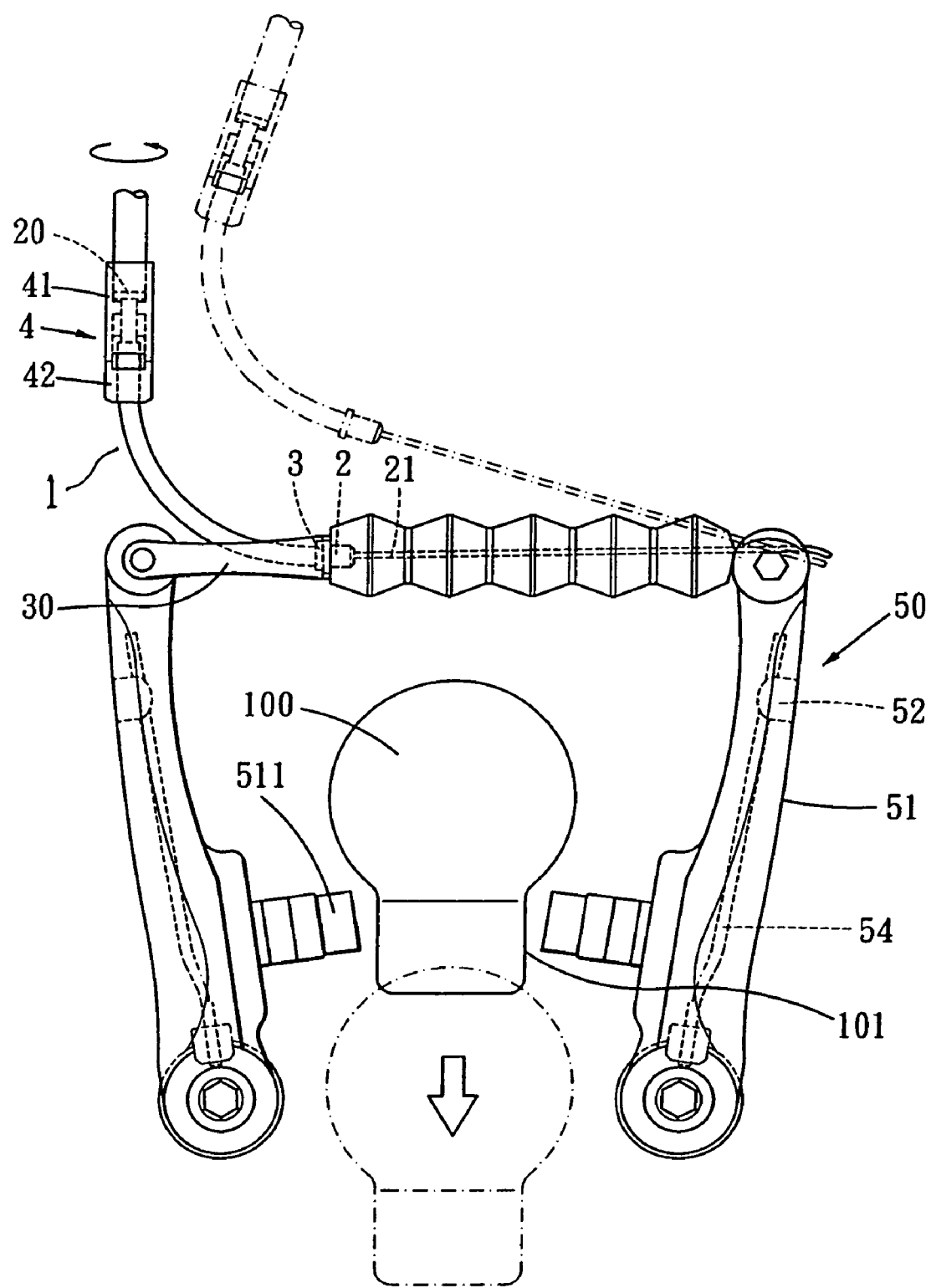
FIG. 6 is a side view showing the brake arms under the imbalanced condition when the conduit is relieved according to the present invention.

To disassemble the wheel 100, as illustrated in FIG. 6, a user pulls the first tubular body 41 so that its teeth 4141 are separated from the teeth 4241 of the second tubular body 42. The user then rotates the first tubular body 41 so that its non-indented sections 414 are fitted inside the indented sections 425 of the second tubular body 42. The adjusting tube 4 thereby becomes shorter, which makes room for the connector 2 to be separated from the slot 31. The conduit 1 is therefore relieved from the connection seat 30. Without the balancing force from the brake wire 21, the return springs 54 extends the brake arms 51 outward, enlarging their gaps to the wheel rim 101. The wheel 101 therefore could be easily disassembled from the front fork through the enlarged gaps.

After assembling the wheel 100 back to the front fork, the user first places the connector 2 back to the slot 31. The user then pulls the first tubular body 41 so that the non-indented sections 414 are away from the indented sections 425 of the second tubular body 42. The user then twists the first tubular body 41, aligns the non-indented sections 414 and 424, and releases the first tubular body 41. The teeth 4141 and 4241 are occluded together again, and the brake wire 21 returns to a stretched condition to balance the force exerted by the return spring 54. The left and right brake arms 51 thereby return to their normal and parallel positions.

In summary, the present invention relies on having rotating first and second tubular bodies 41, 42 at an end of the conduit 1 so that the conduit 1 could be removed from the connection seat 30 and the gap between the brake pad 511 and the wheel rim 101 could be enlarged for the fast disassembly and assembly of the wheel 100.

Furthermore, to ease the rotation of the first and second tubular bodies 41, 42 by the user's fingers, the cylindrical surfaces of the first and second tubular bodies 41, 42 could have rough patterns.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A bicycle handbrake conduit structure comprising:
a conduit with a connector having a first flange on one end and an adjusting tube on the other end, wherein said adjusting tube is composed of a first tubular body and a second tubular body, each of said first and second tubular bodies has matching through holes so that, when said first and second tubular bodies are joined together, said matching through holes being aligned to allow a brake cable having a second flange at one end to be inserted through said matching through holes, said brake cable in turn has a brake wire inserted through, each of said first and second tubular bodies has indented sections and non-indented sections along the tubular wall on an end of said first and second tubular bodies, said indented sections are indented for a predetermined distance, said indented sections and non-indented sections are configured so that, when said first and second tubular bodies are joined together and said indented and non-indented sections are aligned, said non-indented sections of said first tubular body is fitted inside said indented sections of said second tubular body, and said non-indented sections of said second tubular body is fitted inside said indented sections of said first tubular body.

2. The bicycle handbrake conduit structure according to claim 1, wherein said connector of said conduit is fitted in a slot on a connection seat riveted perpendicularly to a brake arm, said connection seat is a long, narrow, and open box, said slot is at a shorter end of said connection seat opposite to where said connection seat is riveted to said brake arm, said first flange of said connector is against an inner wall of said slot.

3. The bicycle handbrake conduit structure according to claim 1, wherein said first tubular body has its inner wall shrunk at a location along the body of said first tubular body forming a through hole and a blocking wall inside said first tubular body at said location and separating the inside of said first tubular body into two sections having a larger diameter than that of said through hole, said through hole allows a brake cable having a second flange on one end to be inserted through, said blocking wall being configured to abut said second flange so that said brake cable does not fall through said through hole.

4. The bicycle handbrake conduit structure according to claim 1, wherein said non-indented sections of said first and second tubular bodies have a plurality of teeth so that, when said first and second tubular bodies are joined together and their non-indented sections are aligned, the teeth are occluded together.

5. The bicycle handbrake conduit structure according to claim 1, wherein said indented and non-indented sections are periodically arranged and interleaved with each other.

6. The bicycle handbrake conduit structure according to claim 1, wherein said non-indented sections of said first and second tubular bodies are aligned and their teeth are occluded together when said conduit is installed on a handbrake assembly for said handbrake assembly to function.

7. The bicycle handbrake conduit structure according to claim 1, wherein, to disassemble a wheel from a bicycle frame, said first and second tubular bodies are rotated so that their indented sections are aligned with their non-indented sections, causing said adjusting tube to be shorter in length, said conduit is therefore able to be removed from said connection seat, a distance between a brake pad and a rim of said wheel is thereby enlarged, and said wheel is able to be disassembled and removed through an enlarged gap.

8. The bicycle handbrake conduit structure according to claim 1, wherein said first and second tubular bodies have rough patterns on their external surfaces for easier rotation by a user's fingers.

* * * * *